Sept. 17, 1935.  M. M. WEISS  2,015,047

AUTOMATIC MEANS FOR COUNTERACTING NOSE DIVES IN AEROPLANES

Filed May 18, 1935

INVENTOR:
Max M. Weiss,
BY
Israel Benjamins,
ATTORNEY

Patented Sept. 17, 1935

2,015,047

UNITED STATES PATENT OFFICE 2,015,047

AUTOMATIC MEANS FOR COUNTERACTING NOSE DIVES IN AEROPLANES

Max M. Weiss, Brooklyn, N. Y.

Application May 18, 1935, Serial No. 22,123

6 Claims. (Cl. 244—29)

This invention relates to improvements in automatic means for counteracting nose dives in aeroplanes, and it consists in the novel features which are hereinafter described.

One of the objects of the invention is to provide an aeroplane with automatic means for raising its elevator when the aeroplane takes an undesired forward dip or nose dive, thereby causing the aeroplane to rise.

Another object of the invention is to enable an aviator to control the above automatic means when a descent of the aeroplane is desired.

A further object of the invention is to facilitate the operation of raising the aeroplane and to make the operation of lowering the aeroplane more strenuous, whereby to enable the aviator to "feel" his course in a vertical direction.

A still other object of the invention is to have the above automatic means simple, compact, durable and relatively inexpensive.

Other objects and advantages will hereinafter appear.

I attain these objects by the mechanism, which is illustrated in the accompanying drawing or by any mechanical equivalent or obvious modification of the same.

Figure 1:
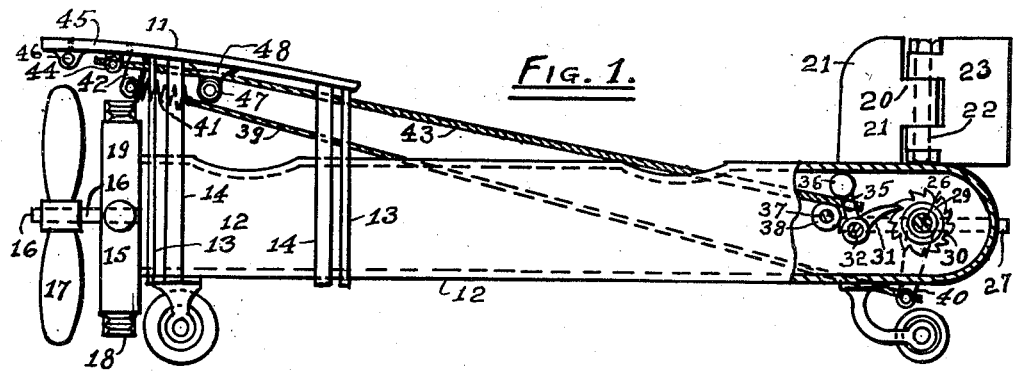
Figure 2:
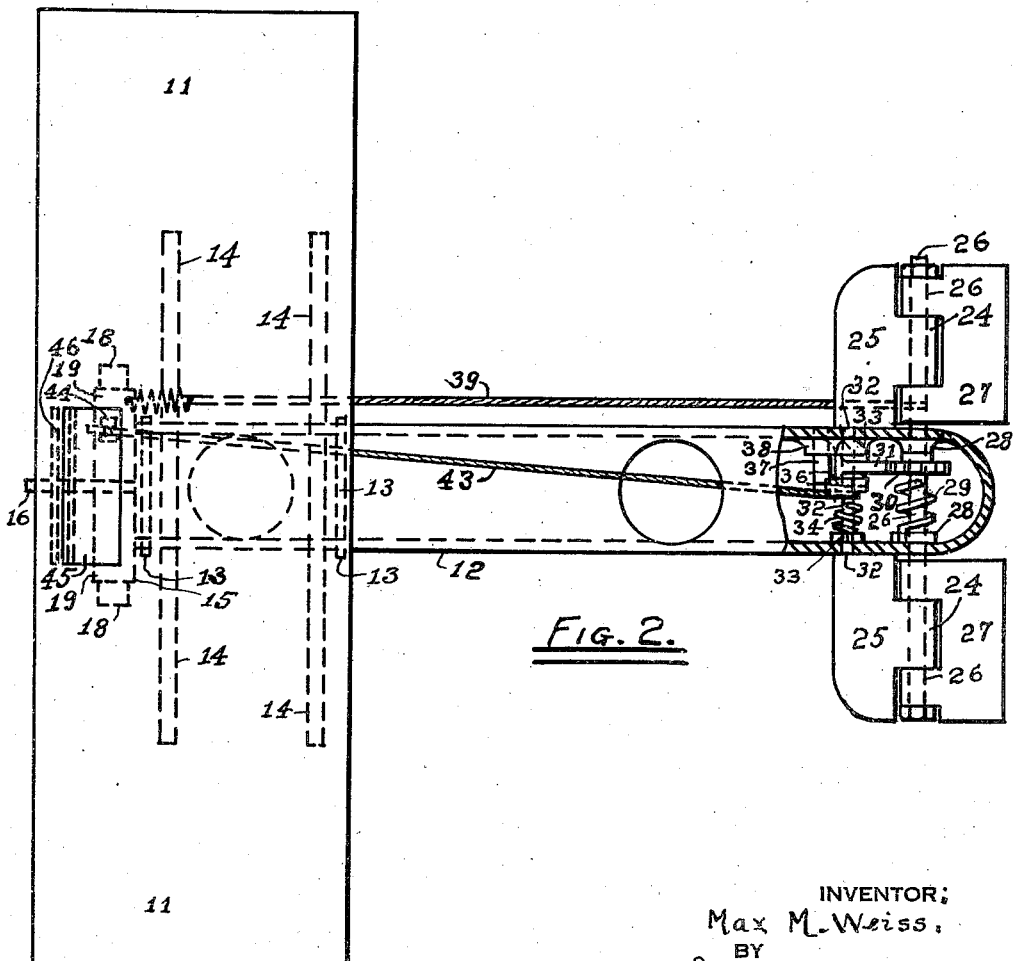

In the drawing Fig. 1 is a side view of an aeroplane embodying my invention partly in elevation and partly in longitudinal vertical section; and Fig. 2 is partly a plan view and partly a horizontal section through the axis of the fuselage of an aeroplane embodying my invention, showing sundry parts in plan view and omitting sundry details.

Similar numerals refer to similar parts throughout the two views of the drawing.

11 designates the wing-member or plane of an aeroplane embodying my invention, and 12 the fuselage thereof.

Bands and straps 13, vertically disposed at their ends and braces 14, diagonally disposed at their ends are shown as supporting the fuselage 12 from the plane 11 by means of their middle portions which pass under the fuselage 12. The connections of the bands 13 and braces 14 to the plane 11 are omitted in the drawing.

An engine 15 is connected to the forward end of the fuselage and has revolvably connected thereto a shaft 16 which has connected thereto at the forward end thereof a propeller 17.

The engine 15 includes a number of radially disposed cylinders 18 connected to each other by means of a ring 19; only some of the cylinders 18 of the engine 15 are shown; others are omitted from the drawing.

The rear end of the fuselage 12 has rotatably connected thereto by means of a bearing 20 in a vertical web 21 and a pin 22 a vertically disposed rudder 23, whereby to steer the aeroplane in a horizontal direction.

The steering lines of the rudder 23 are omitted in the drawing.

The rear end of the fuselage has also pivotally connected thereto by bearings 24 in a pair of horizontal webs 25 and a spindle 26 a pair of elevators 27, whereby to raise and lower the aeroplane.

One large elevator may be used, if desired instead of two.

Additional bearings 28 for the spindle 26 are provided on the inner side of the fuselage 12.

The spindle 26 is shown in Fig. 2 as encompassed by a torsional spring 29, which is initially stressed and has one end thereof connected to the spindle 26 and the other end thereof to the adjacent boss or bearing 28 on the inner side of the fuselage 12.

The spring 29 tends to turn the spindle 26 in a counter-clockwise direction in Fig. 2, whereby to raise the elevators 27.

A ratchet 30 is mounted on and secured to the spindle 26 and is in engagement with a pawl 31 which is mounted on and secured to a spindle 32, which is rotatably supported in bearings 33 on the inner sides of the fuselage 12.

A torsional spring 34 is shown in Fig. 2 as encompassing the spindle 32, and has one end thereof connected to the spindle 32 and the other end thereof to the adjacent bearing 33.

The spring 34 tends to turn the spindle 32 with the pawl 31 thereon in a clockwise direction, whereby to cause the pawl 31 to engage the said ratchet 30 on the spindle 26 and to keep said spindle 26 from turning in a counter-clockwise direction in Fig. 1.

The teeth on the ratchet 30 have a suitable inclination, whereby the ratchet 30 with the spindle 26 may be turned in a clockwise direction, unhindered by the pawl in opposition to the force of the spring 29, but the ratchet 30 and spindle 26 cannot be turned in a counter-clockwise direction by the said spring 29 unless the pawl 31 is first disengaged from the said ratchet 30 by turning the spindle 32 with the pawl 31 thereon in a counter-clockwise direction in opposition to the force of the spring 34.

The spindle 32 is shown in Fig. 1 as having mounted thereon also an upwardly extending arm 35, which is secured to the spindle 32 and is slightly inclined forward from a vertical position; the arm 35 terminates at its upper end in a weight 36, which tends to turn the spindle 32 in a counter-clockwise direction; normally this tendency is amply counterbalanced by the force of the spring 34 when the fuselage 12 is in a horizontal position.

When the aeroplane undesirably inclines forwardly or takes a nose dive, the moment of the weight 36 will increase sufficiently to overcome the force of the spring 34 and will turn the spindle 32 with the pawl 31 thereon in a counter-clockwise direction, thereby disengaging the ratchet 30 from the pawl 31, whereupon the spindle 26 with the ailerons 27 thereon will be turned by the spring 29 in a counter-clockwise direction, thereby raising the elevators 27 against the pressure of the headwind until the force of the spring 29 will be balanced by the pressure of the headwind against the elevators 27.

The elevated position of the elevators 27 will turn the aeroplane upwardly and check its coarse downwardly.

To limit the amplitude of the motion of the pawl 31 away from the ratchet 30 and to prevent the weight 36 from falling too low, I provide a stop 37 which is secured at one end thereof to a boss 38 on one of the inner sides of the fuselage 12.

The stop 37 is disposed to intercept the arm 35 with the weight 36 thereon and keep the latter within a short distance from its normal position, whereby, when the fuselage is returned to a substantially horizontal position, the spring 34 will turn the spindle 32 with the pawl thereon in a clockwise direction, thereby bringing the pawl 31 into engagement with the ratchet 30, and thereby also bringing the arm 35 with the weight 36 thereon to their normal position as shown in Fig. 1.

When it is desired to lower the elevators 27, the latter may be turned by the aviator in a clockwise direction by means of a line or cord 39 having its rear end attached to a downwardly extending arm 40, which is secured to the spindle 26, as shown in Fig. 1.

The pawl 31 will not interfere with the clockwise rotation of the ratchet 30 on the spindle 26.

The line or cord 39 has its forward end yieldably connected by means of a spring 41 to a bracket 42 extending downwardly from the plane 11.

The spring 41 is relatively weak and does not prevent the action of the spring 29 in raising the elevators 27 as hereinbefore described.

To insure against failure or delay in the action of the weight 36 in releasing the ratchet 30 by disengaging the pawl 31 therefrom, I provide an additional means for accomplishing the same purpose, as follows:

A line or cord 43 is connected at the rear end thereof to the arm 35 and at the forward end thereof to a bracket 44 which extends downwardly from a pilot plate 45, which is hingedly connected to the plane 11 at 46 normally to cover an opening in the plane 11 and is disposed to open downwardly and close upwardly against said plane 11 at the edges of the opening in the latter.

The forward end of the line 43 before reaching the bracket 44 passes over a roll or pulley 47, which is pivoted on a bracket 48 depending from the plane 21.

The pilot plate 45 normally coincides with the plane 11 and forms part of the latter, and receives the headwind on the underside thereof.

When the aeroplane takes a nose dive and dips sufficiently low at the forward end thereof, the headwind will impinge on the upper side of the aeroplane and will then turn the plate 45 on its hinge 46 and swing the pilot plate 45 downwardly into a position which is parallel to the headwind.

The rear end of the plate 45 with the bracket 44 thereon will pull the forward end of the line or cord 43 forwardly and downwardly over the pulley 47, thereby causing the rear end of the line 43 to swing the arm 35 in a direction to turn the spindle 32 with the pawl 31 thereon out of engagement with the ratchet 30, thereby releasing the spindle 26 to be turned by the spring 29 in a direction to raise the elevators 27, and thereby to counteract the nose dive of the aeroplane.

The line 43 may also be employed by the aviator for normally raising the aeroplane by pulling on the cord by hand to disengage the pawl 31 from the ratchet 30.

Variations are possible and parts of my invention may be used without other parts.

I claim as my invention and desire to secure by Letters Patent:

1. An automatic means for counteracting nose dives in aeroplanes, comprising a wing member, a fuselage, and one or more elevators, a spindle for rotatably connecting the elevators to the fuselage, a resilient means for turning the said spindle in a direction to raise the elevators, one-way engaging means for normally permitting the spindle to be turned in a direction to lower the elevators and for arresting the rotation of the said spindle in a direction to raise the elevators, a spring for keeping said engaging means in action, and automatic means for releasing said spindle from said engaging means, said releasing means controlled by the inclination of the aeroplane in the atmosphere.

2. The elements of claim 1, said resilient means consisting of an initially stressed torsional spring connected at one end thereof to said spindle and at the other end thereof to said fuselage.

3. The elements of claim 1, said one-way engaging means consisting of a ratchet mounted on and secured to said spindle and a spring pressed pawl, rotatably connected to said fuselage, in engagement with said ratchet, the teeth on said ratchet being disposed to permit the rotation of said spindle in a direction to lower the ailerons.

4. The elements of claim 1, said releasing means consisting of a weighted arm pivotally connected to said fuselage and connected to said engaging means, said arm being disposed to have the moment of the gravity thereof increased by a forward dip of the aeroplane, thereby releasing the said spindle from the said one-way engaging means.

5. The elements of claim 1, said releasing means consisting of a weighted arm rotatably connected to said fuselage and connected to said engaging means, said arm being disposed to have the moment of the gravity thereof increased by a forward dip of the aeroplane, combined with a stop means secured to the fuselage, for limiting the amplitude of the motion of said arm, whereby the latter may readily be returned to its original position by said spring when the aeroplane returns to its normal position in the atmosphere.

6. The elements of claim 1, said releasing means consisting of a pilot plate on the aeroplane, rotatably connected thereto, normally to act as a part of the aeroplane and to be deflected with relation thereto by the headwind acting on the top of the aeroplane when the latter is dipped forwardly to a considerable extent, and a line connected at one end thereof to said pilot plate and at the other end thereof to a part on said engaging means, whereby to release the spindle from the said engaging means by the deflection of the said pilot plate.

MAX M. WEISS.